United States Patent [19]

Galvin

[11] Patent Number: 5,749,262
[45] Date of Patent: May 12, 1998

[54] CRANK MECHANISM

[76] Inventor: George Frederic Galvin, 9 Christchurch Road, Sidcup, Kent DA15 7HG, England

[21] Appl. No.: 464,872
[22] PCT Filed: Nov. 11, 1994
[86] PCT No.: PCT/GB94/02484
§ 371 Date: Jul. 5, 1996
§ 102(e) Date: Jul. 5, 1996
[87] PCT Pub. No.: WO95/13464
PCT Pub. Date: May 18, 1995

Related U.S. Application Data

[63] Continuation-in-part of Ser. No. 165,969, Dec. 10, 1993, abandoned, which is a continuation-in-part of Ser. No. 910,186, Jul. 16, 1992, Pat. No. 5,297,448.

[30] Foreign Application Priority Data

Nov. 11, 1993 [GB] United Kingdom ............. 9323191

[51] Int. Cl.[6] ............................................. F16H 21/34
[52] U.S. Cl. ............... 74/44; 123/54.2; 123/54.6; 123/197.3
[58] Field of Search ............. 74/44; 123/197.3, 123/197.4, 54.1, 54.2, 54.6

[56] References Cited

U.S. PATENT DOCUMENTS 1,555,598  9/1925  Myers ........................ 74/44 X
1,780,854  11/1930 Watts et al. ............. 123/54.2 X
1,995,554  3/1935  Ulinski ....................... 74/44
2,625,048  1/1953  Vissat ......................... 74/44
3,366,073  1/1968  Andrews et al. .
3,946,706  3/1976  Pailler .................... 123/54.2

FOREIGN PATENT DOCUMENTS 3134791  3/1983   Germany ................ 123/197.4
8914968 U 12/1989 Germany .
496501   1/1938   United Kingdom .

Primary Examiner—Allan D. Herrmann
Attorney, Agent, or Firm—Baker & Daniels

[57] ABSTRACT

A crank mechanism for an internal combustion engine comprises a cylinder (1), a piston (2) reciprocable within the cylinder, and a rotatable shaft (4). The piston (2) is a drivable connection with the shaft (4) via a connecting rod (3), a drive ring (5) and a torque lobe (6). The connecting rod (3) is pivotally fixed to the piston (2), and the drive ring (5) is rigidly attached to the free end of the connecting rod (3). The torque lobe (5) is a circulate plate eccentrically mounted on the shaft (4) for rotation therewith about the axis thereof. The drive ring (5) is an annular sleeve which is a rotatable sliding fit around the rim of the torque lobe (6). The axis of the piston (2) is offset with respect to the center of the output shaft (4), whereby rectilinear movement of the piston (2) is converted to rotary movement of the torque lobe (6) or vice versa.

24 Claims, 11 Drawing Sheets

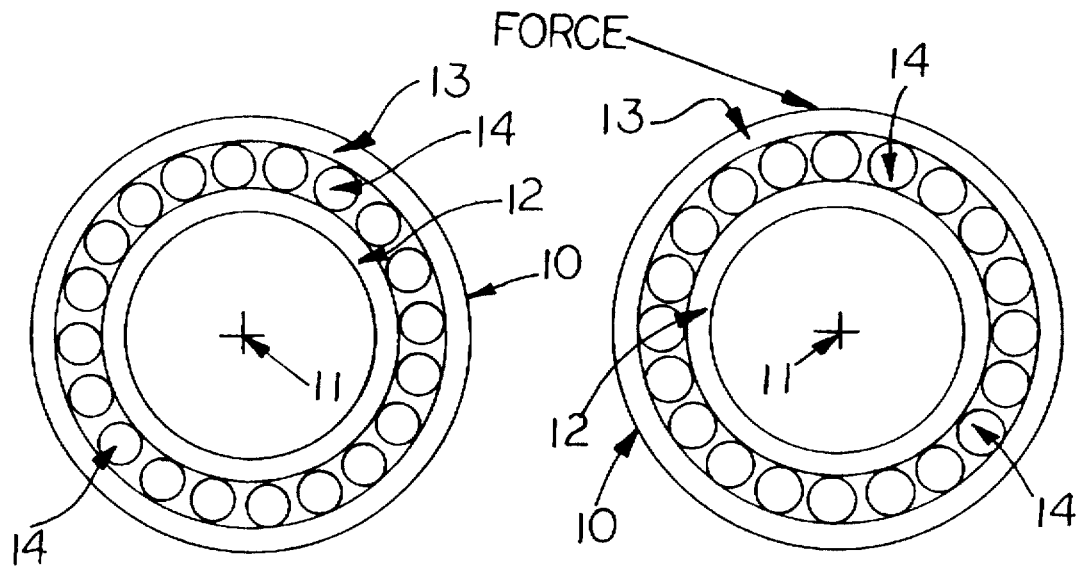
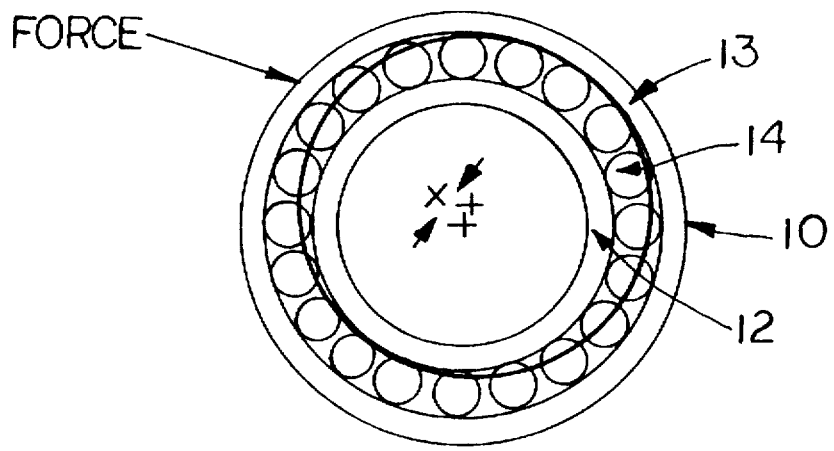

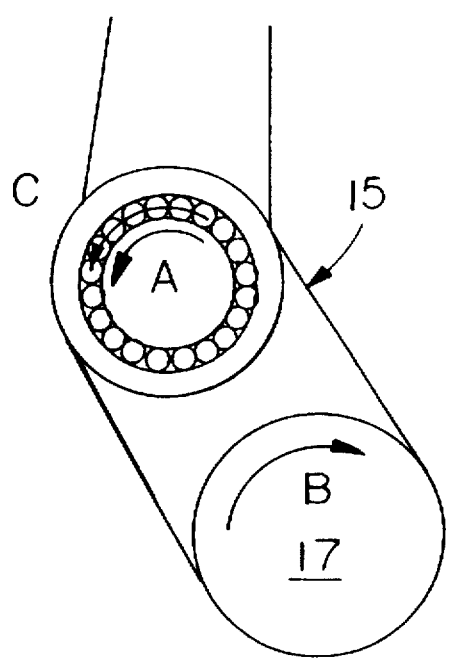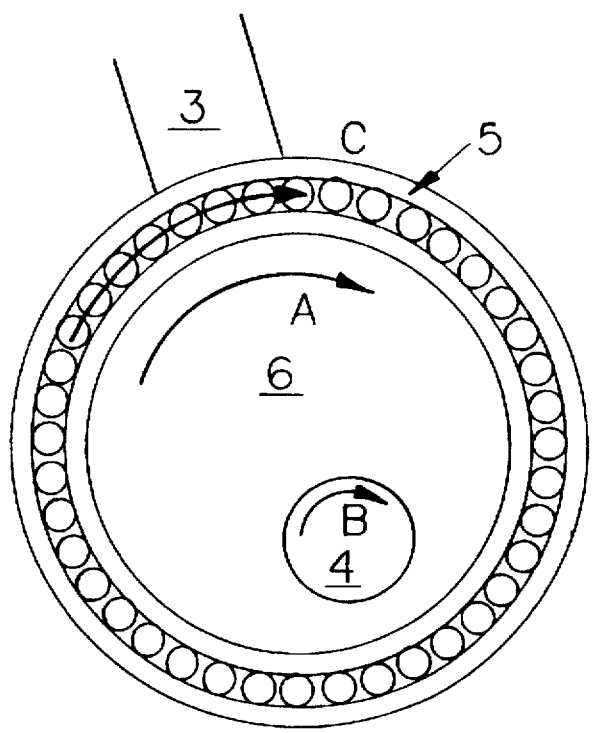
FIG.4D
FIG.4E

CRANK MECHANISM

This application is a continuation-in-part of U.S. patent application Ser. No. 08/165,969, filed Dec. 10, 1993, and now abandoned, which is a continuation-in-part of U.S. patent application Ser. No. 07/910,186, filed Jul. 16, 1992, now U.S. Pat. No. 5,297,448.

This invention relates to a crank mechanism for an internal combustion engine.

A conventional internal combustion engine employs a crankshaft to convert the reciprocating motion of the piston (s) into output torque to propel a vehicle or to act upon any other load. The crankshaft is inefficient in terms of converting the power available from the fuel combustion into usable output torque. This is because combustion of the fuel/air mixture takes place at approximately the top dead centre (TDC) position of the piston. Not only the crankpin, but also the crankshaft main bearings, are consequently subjected to periodic heavy stresses. What is of greater significance, however, is that, with an internal combustion engine provided with conventional drive gear, the ignited fuel/air pressure forces cannot produce torque when the piston is either at TDC or bottom dead centre (BDC), as the connecting rod and the crankpin are practically in a straight line so that there is no force component tangential to the crank circle. This results in most of the available energy being lost as heat. The torque necessary to carry the crankshaft through these two dead centre positions is supplied by the inertia of the flywheel of the engine. Moreover, by the time the crankshaft has rotated through almost 90° beyond TDC, where the turning moment is a maximum, the piston force is greatly reduced, so that the resulting torque is relatively small.

My International patent application WO91/10848 describes a crank mechanism for an internal combustion engine, the crank mechanism comprising a cylinder, a piston reciprocable within the cylinder, and a rotatable shaft. The piston is in drivable connection with the shaft via a connecting rod, a drive ring and a torque lobe. The connecting rod is pivotally fixed to the piston, and the drive ring is pivotally attached to the free end of the connecting rod. The torque lobe is a circular plate eccentrically mounted on the shaft for rotation therewith about the axis thereof. The drive ring is slidable along, but restrained to, the rim of the torque lobe, and the drive ring is constrained to move around a closed path whereby rectilinear movement of the piston is converted to rotary movement of the torque lobe or vice versa. The drive ring is provided with cam follower means which engage with associated cam track means adjacent to the torque lobe, the cam follower means and the cam track means constituting means for constraining the drive ring to move round the closed path.

A disadvantage of this crank mechanism is the need for the cam track means and the cam follower means, which complicate the design. Moreover, this mechanism requires an anti-reverse device for preventing the torque lobe from rotating in the reverse direction at BDC at the end of the induction stroke.

The present invention provides a crank mechanism for an internal combustion engine, the crank mechanism comprising a cylinder, a piston reciprocable within the cylinder, and a rotatable shaft, the piston being in drivable connection with the shaft via a connecting rod, a drive ring and a torque lobe, the connecting rod being pivotally fixed to the piston, and the drive ring being rigidly attached to the free end of the connecting rod, wherein the torque lobe is a circular plate eccentrically mounted on the shaft for rotation therewith about the axis thereof, wherein the drive ring is an annular sleeve which is a rotatable sliding fit around the rim of the torque lobe, and wherein the axis of the piston is offset with respect to the centre of the output shaft whereby rectilinear movement of the piston is converted to rotary movement of the torque lobe or vice versa.

This mechanism has the advantages of not requiring either cam track/cam follower means or an anti-reverse device, and so is a simpler and more reliable mechanism than my earlier crank mechanism, whilst still having improved torque characteristics.

The invention also provides a crank mechanism for an internal combustion engine, the crank mechanism comprising a plurality of cylinders, a respective piston reciprocable within each of the cylinders, and a rotatable shaft, each of the pistons being in drivable connection with the shaft via a respective connecting rod, a respective drive ring and a respective torque lobe, each connecting rod being pivotally fixed to the associated piston, and each drive ring being rigidly attached to the free end of the associated connecting rod, wherein each torque lobe is a circular plate eccentrically mounted on the shaft for rotation therewith about the axis thereof, wherein each drive ring is an annular sleeve which is a rotatable sliding fit around the rim of the associated torque lobe, and wherein the axis of each piston is offset with respect to the centre of the output shaft whereby rectilinear movement of the pistons is converted to rotary movement of the torque lobe or vice versa.

Preferably, the or each drive ring is a rolling fit on the rim of the associated torque lobe. In this case, the or each drive ring is mounted on the rim of the associated torque lobe by means of a respective rolling element bearing, whereby the rolling elements and the torque lobe rotate in the same direction, thereby increasing the turning moment of the torque lobe and hence that of the crank mechanism.

Advantageously, the axis of the or each piston is offset from the axis of the output shaft by a distance equal to substantially half the stroke of the associated piston.

In a preferred embodiment, the or each connecting rod is constituted by a main connecting rod and at least one auxiliary connecting rod, the or each auxiliary connecting rod being slidably fixed to the main connecting rod for axial movement relative thereto, the associated piston being fixed to the or each auxiliary connecting rod, and the main connecting rod being fixed to the associated drive ring. Conveniently, a respective pair of auxiliary connecting rods are associated with the or each main connecting rod, the auxiliary connecting rods of the or each pair being positioned one on each side of the associated main connecting rod and being slidably fixed thereto by axial slots formed in the main connecting rod and pins projecting from the auxiliary connecting rods and passing through the slots. The or each auxiliary connecting rod may be associated with a respective cam fixed to the associated torque lobe. Where there are two auxiliary connecting rods associated with the or each main connecting rod, the two associated cams are fixed to opposite sides of the associated torque lobe.

Preferably, the or each cam is formed with a cam drive face which engages with the free end of the associated auxiliary connecting rod over the first 90° of movement of the associated piston during its power stroke, thereby applying a turning moment to said cam and hence to said cam and hence to said torque lobe. The or each cam may be formed with a return cam face which engages the free end of the associated auxiliary connecting rod during the movement of the associated piston in its exhaust stroke, and over the last 90° of movement of the said piston during its compression stroke.

Advantageously, the mechanism further comprises a respective spring associated with the or each auxiliary connecting rod, the or each spring being effective to hold the associated auxiliary connecting rod out of contact with its cam during the induction stroke of the associated piston.

The addition of the auxiliary connecting rod(s) arranged to run parallel to the main connecting rod leads to a further improvement in the crank mechanism. This is because the or each piston imparts high turning moments via the associated cam(s) to the output shaft for the first 90° travel on the power stroke. The turning moment is closely matched to the power curve, thereby maximising the output power. The mechanism then reverts to the arrangement previously described for the second 90° travel of the power stroke, utilising the advantages of that system. The cam arrangement which includes the spring(s) has the advantage of a smooth action, as well as resetting the auxiliary connecting rods. It also creates a situation where resonance can occur provided by the rotating mass and spring compliance, such that the system will have a very high efficiency at a particular rotational speed.

Conveniently, there are six cylinders arranged in two banks of three cylinders, the cylinders in each bank being in a flat radial configuration. In this case, the three torque lobes associated with each bank of three cylinders may all be fixed to the output shaft in such a manner that the lines joining the centre of the output shaft to the centres of said torque lobes are angled to one another by 120°.

The invention will now be described in greater detail, by way of example, with reference to the accompanying drawings, in which:

FIGS. 4a to 4e are diagrams illustrating how improved torque is achieved with the engine of FIGS. 1 and 2;

Figure 1:
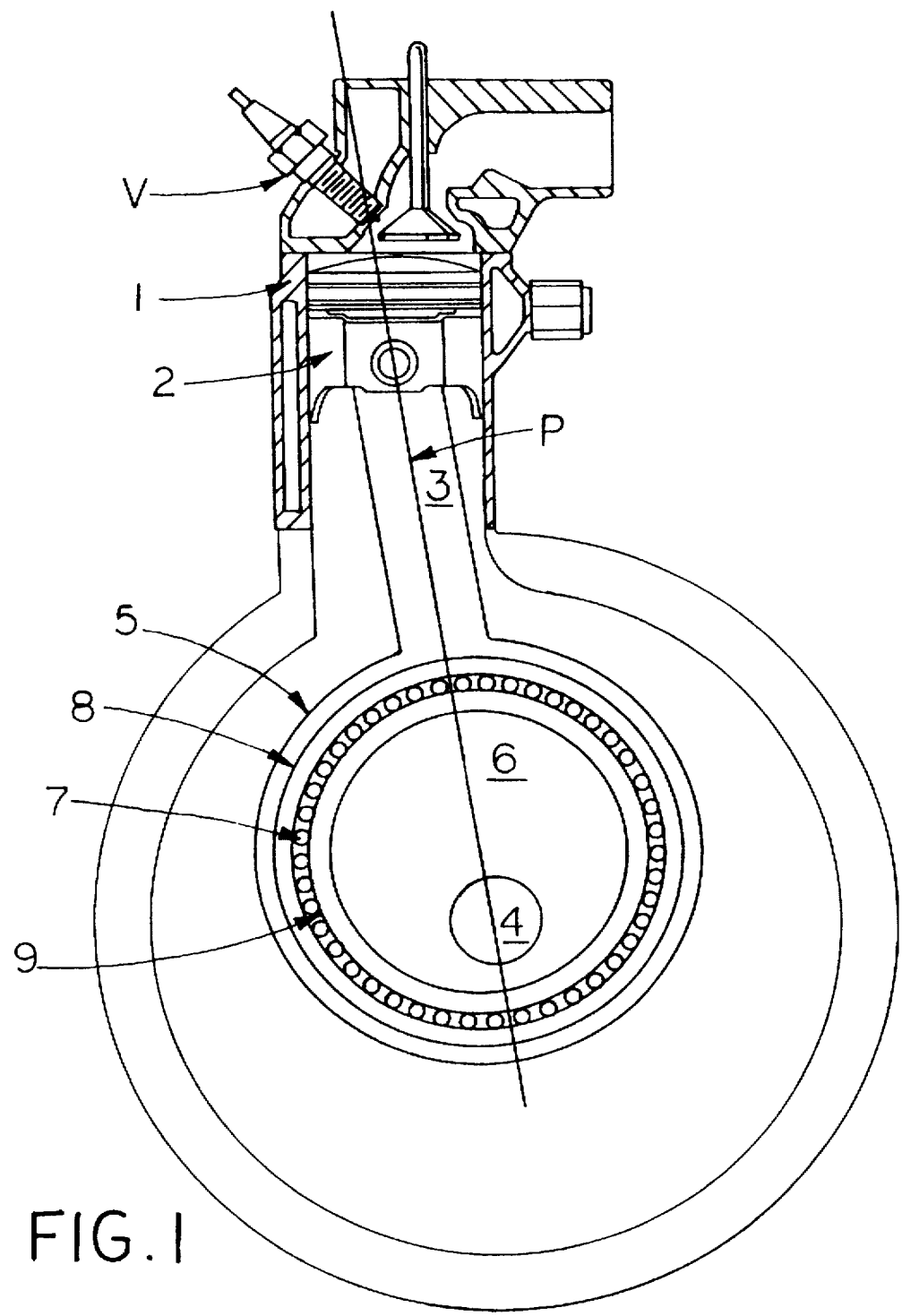
FIG. 1 is a schematic part-sectional elevation of a simplified form of internal combustion engine which illustrates the principle of the invention.
Figure 2:
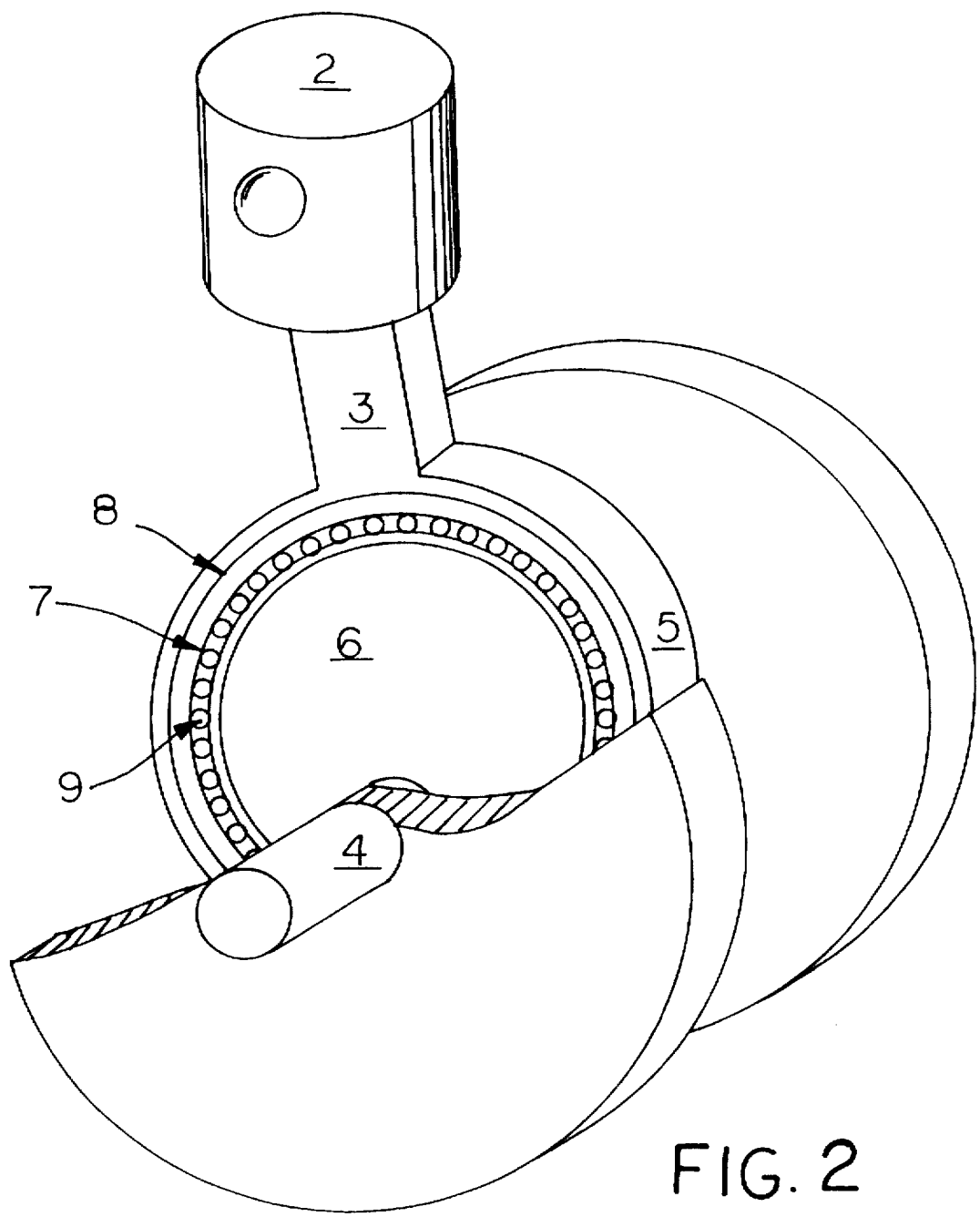
FIG. 2 is a schematic, partially broken away, perspective view of the engine of FIG. 1.
Figure 3A:
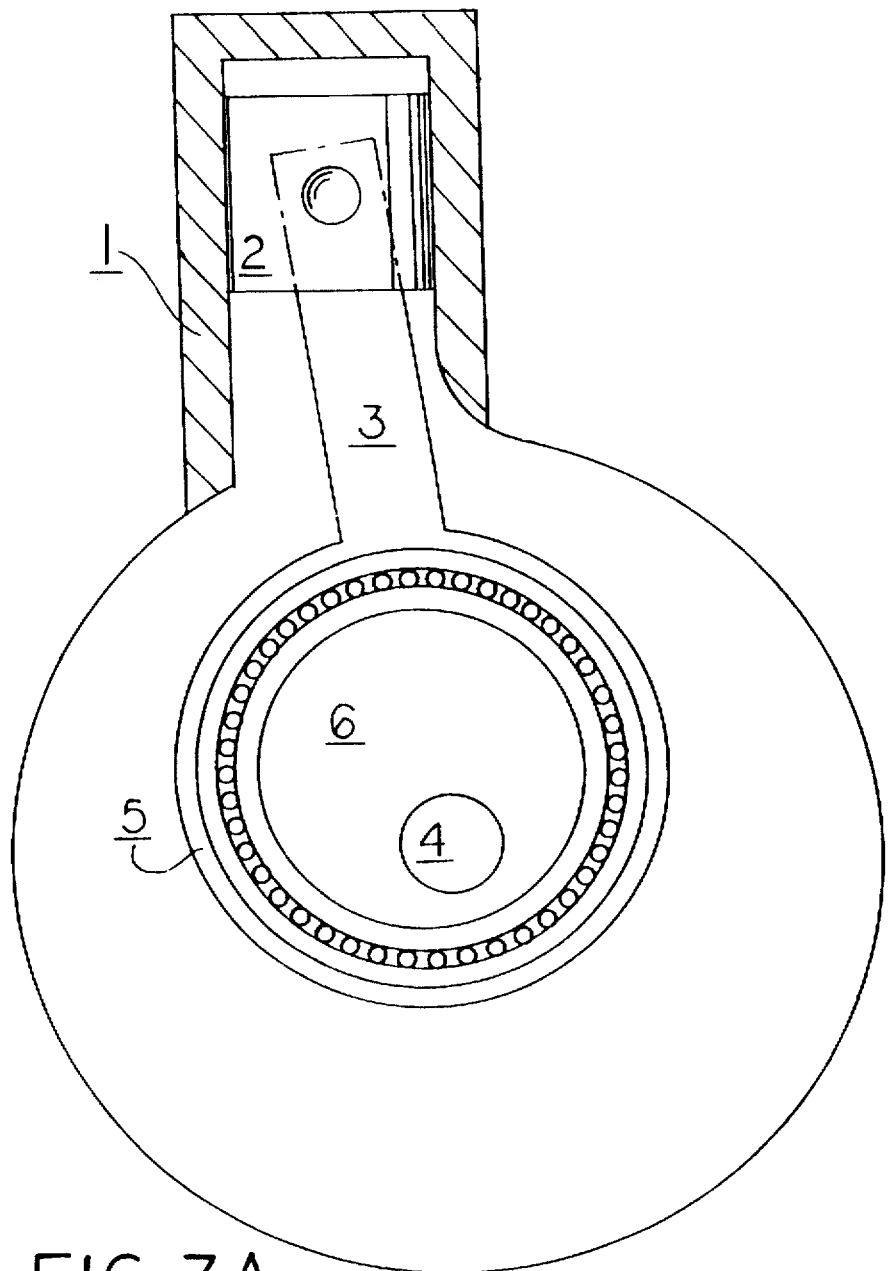
FIGS. 3a to 3d are diagrams illustrating different stages of the operation of the engine of FIGS. 1 and 2.
Figure 3B:
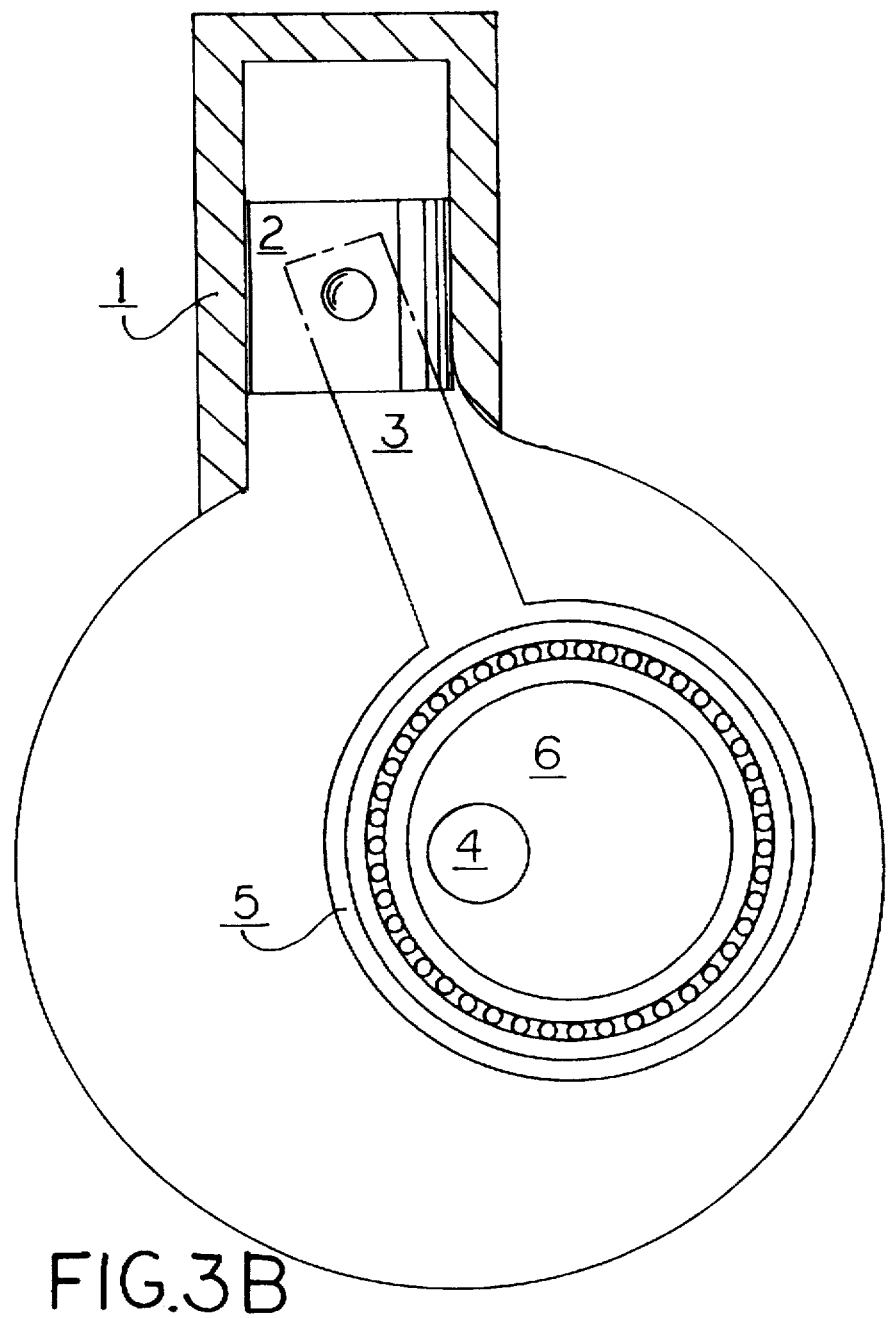
Figure 3C:
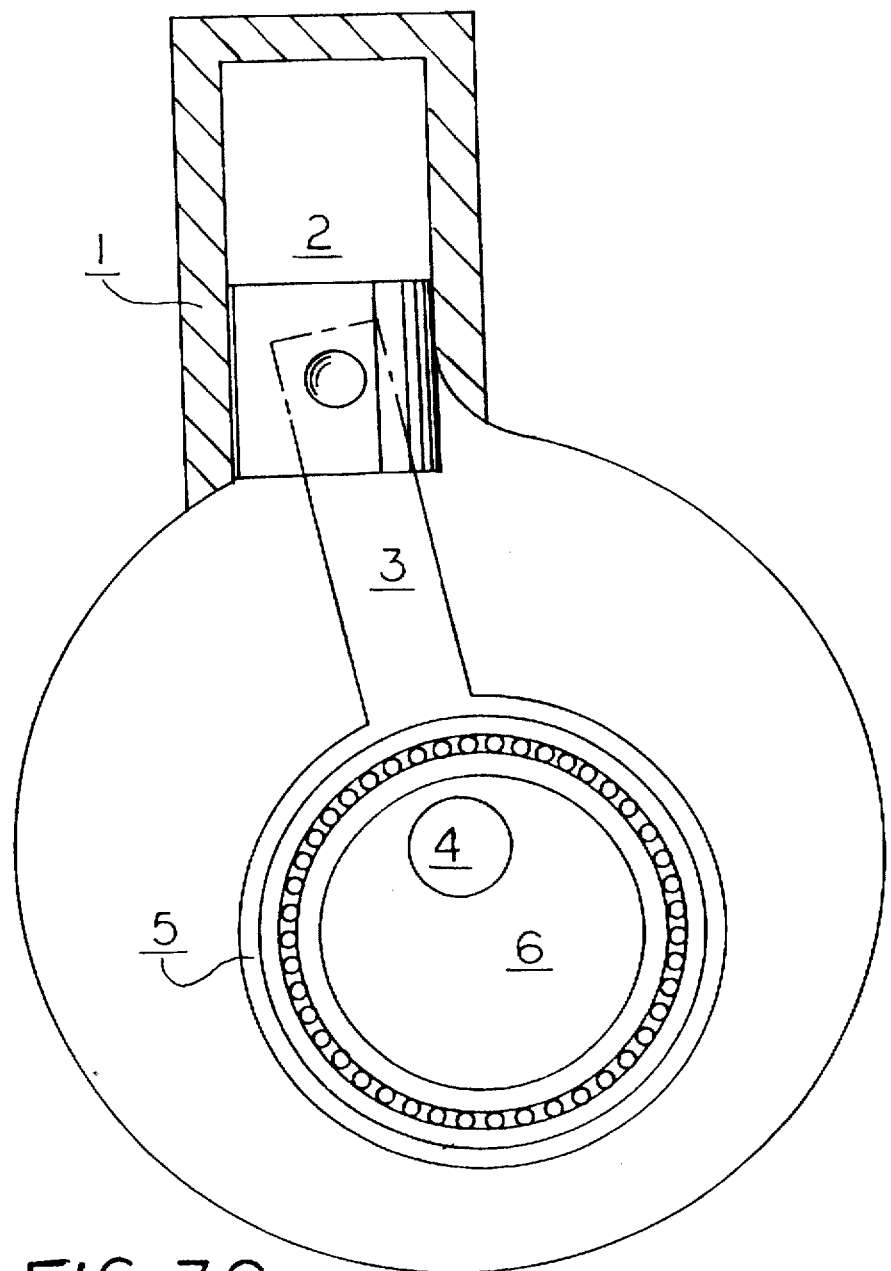
Figure 3D:
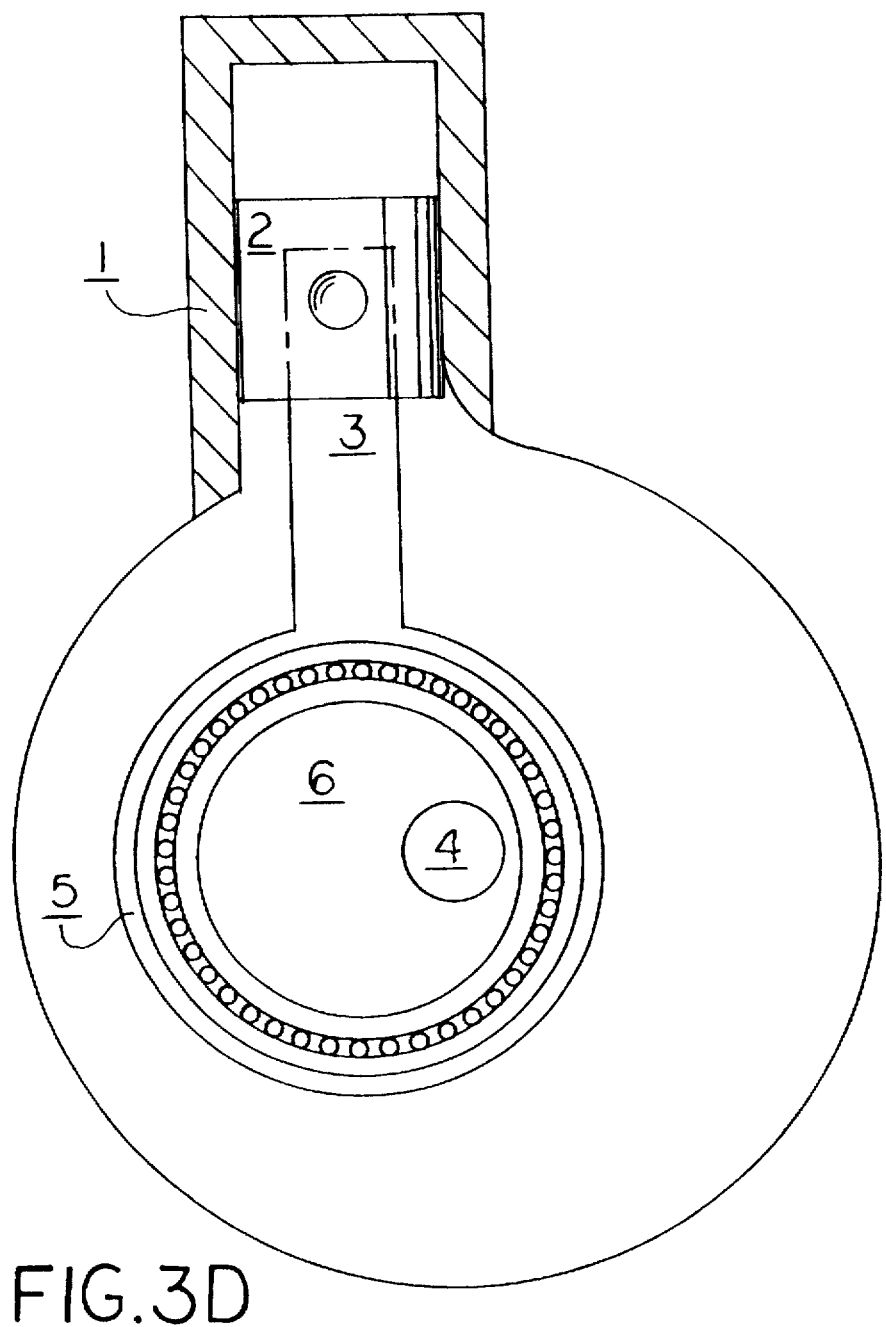

Referring to the drawings, FIGS. 1 and 2 show a simple form of internal combustion engine. The engine has a single cylinder 1 in which a piston 2 is reciprocable. The piston-and-cylinder arrangement 1, 2 has a conventional valve arrangement indicated generally by the reference V, and can be powered by petrol, diesel or any other acceptable fuel. A connecting rod 3 is pivotally fixed to the piston 2, the connecting rod rotatably driving an output shaft 4 via a drive ring 5 and a torque lobe 6. The connecting rod 3 is rigidly fixed to the drive ring 5. The torque lobe 6 is constituted by a circular plate, which is eccentrically mounted on the shaft 4. As shown best in FIGS. 1 and 3, the axis of the piston 2 is offset with respect to the centre of the output shaft 4, that is to say the line of action of the piston does not pass through the centre of the output shaft.

As shown best in FIG. 2, the drive ring 5 is an annular sleeve which can slide round the torque lobe 6 as it rotates. The drive ring 5 is attached to a ring (not shown) fixed to the outer race 8 of a ball bearing 7 whose inner race 9 is fixed to the peripheral edge of the torque lobe 6. A roller bearing could be used in place of the ball bearing.

The operation of the single cylinder engine of FIGS. 1 and 2 will now be described with reference to FIGS. 3a to 3d. The operating cycle is best understood by describing the operation of a four-stroke cycle starting with the piston 2 at TDC. In this position (see FIG. 3a), the piston 2 has just completed its compression stroke, ignition having taken place just before TDC. The expanding gases formed by the ignition explosion force the piston 2 to descend rapidly within the cylinder 1, whereby the connecting rod 3 and the drive ring 5 force the torque lobe 6 to rotate to the position shown in FIG. 3b. This movement of the piston 2 is the power stroke of the engine. Further rotation of the torque lobe 6 carries the piston 2 past BDC (see FIG. 3c), where appropriate action of the valve arrangement (not shown in this figure) causes the spent gases to be exhausted from the engine. The momentum of the torque lobe 6 and/or a flywheel (not shown) on the output shaft 4 carries the piston 2 upwards through the position shown in FIG. 3d and towards TDC. After the piston 2 is carried past TDC, the momentum of the flywheel forces the piston and the drive ring 5 down into the induction stroke (see FIGS. 3a and 3b).

Once the piston 2 has passed BDC, it is carried upwards into the compression stroke (see FIGS. 3c and 3d) by the momentum of the torque lobe 6 and/or the flywheel. The operating cycle then starts again with the piston 2, the drive ring 5 and the torque lobe 6 in the positions shown in FIG. 3a.

During the four strokes, the drive ring 5 is constrained to follow the rotation of the torque lobe 6 twice (see FIG. 6a), the TDC position of the piston 2 being offset from the axis of the shaft 4 by a distance equal to half the length of the stroke of the piston, or by a distance chosen to match the characteristics of the input energy. This enhances the torque produced by the engine by increasing the moment of the descending piston 2 about the axis of rotation (the axis of the shaft 4), in a manner described below with reference to FIGS. 4a to 4e.

FIGS. 4a to 4e show the principle underlying the derivation of the improved torque of the engine of FIGS. 1 and 2. FIG. 4a shows a conventional ball bearing 10, this bearing normally rotating about its own geometric axis 11 with either its inner ring 12 or its outer ring 13 held. However, if an external force F (see FIG. 4b) is applied to the outer ring 13, thereby causing the bearing 10 to rotate, this force produces a two-link mechanism whereby the balls 14 of the bearing 10 are rotated about their own axes in the direction opposite to that in which the inner ring 12 rotates, such that the balls rotate on the outer ring (which is not free to move). The combined effect of the external force F and the rotation of the balls 14 has the effect of moving the centre of the turning circle of the ball cage (not shown) by an amount x equal to the radius of the balls (see FIG. 4c).

Applying this theory to a conventional crank mechanism 15 (see FIG. 4d), it can be seen that the crank pin 16 rotates in the direction of the arrow A, this direction being opposite to the direction B of rotation of the output shaft 17 of the mechanism 15. Thus, the output shaft 17 rotates in the opposite direction to that (C) in which the balls of the bearing rotate. The resultant shift (not shown) of the centre of the turning circle of the ball cage, therefore, has the effect of reducing the overall turning moment of the output shaft by the ratio of ball radius to crank throw radius (that is to say the distance between the centres of the crank pin 16 and the output shaft 17). If, however, this principle is applied to the torque lobe mechanism of FIGS. 1 and 2, the output shaft 4

(see FIG. 4e) rotates in the same direction B as that (A) in which the torque lobe 6 rotates. Thus, the output shaft 4 rotates in the same direction as that (C) in which the balls of the bearing 7 rotate. The shift (not shown) of the centre of the turning circle of the balls will, therefore, assist the overall turning moment of the output shaft 4 by the ratio of ball radius to centre-of-lobe to centre-of-output shaft distance (that is to say the turning moment). As the piston 2 is offset with respect to the centre of the output shaft 4, this assists the overall improvement by increasing the force applied to the torque lobe 6 by the inverse cosine (secant) of the angle between the axes of the connecting rod 3 and the piston.

Clearly, the larger the bearing ball diameter for a given torque lobe turning moment the greater the overall power output from the engine within engineering limits.

Figure 5:
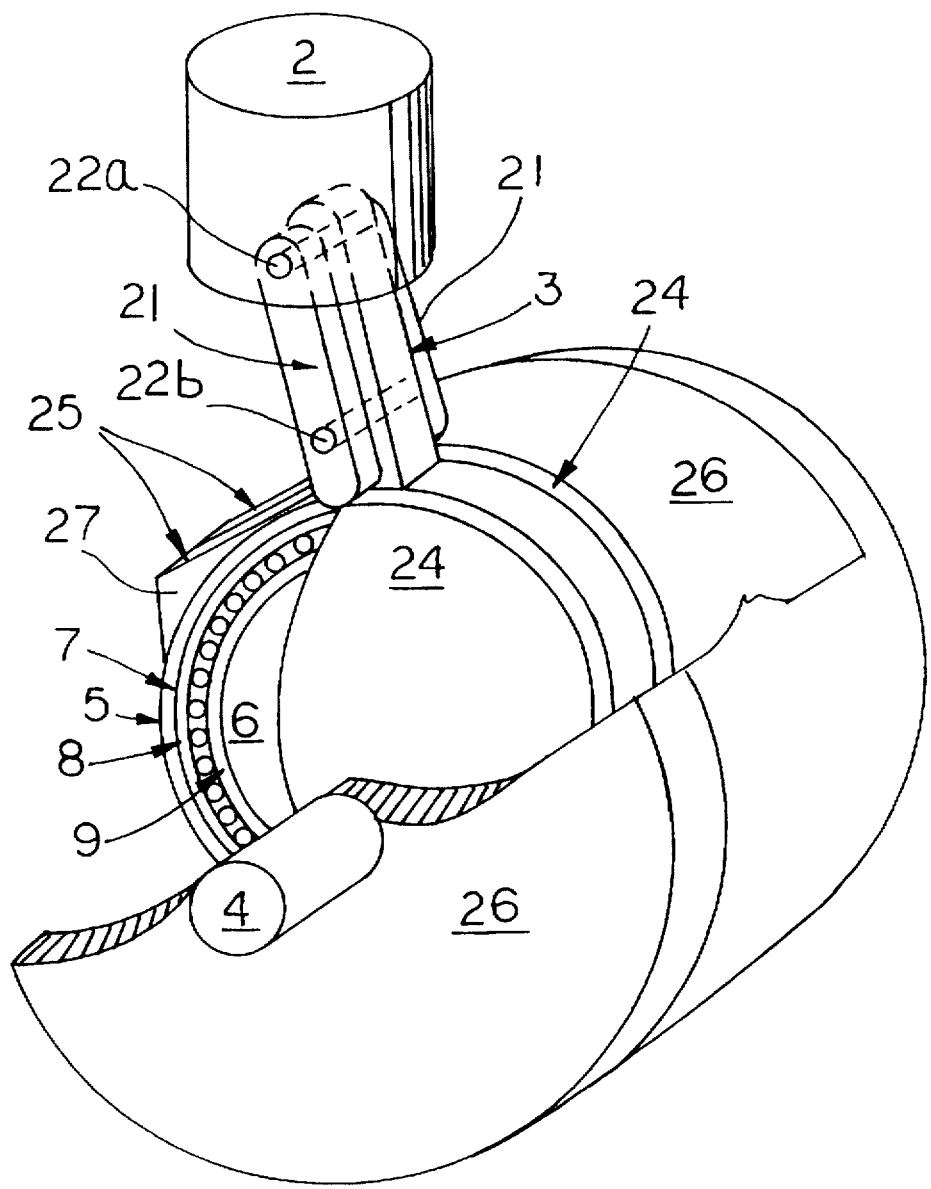
FIG. 5 is a perspective view of an internal combustion engine incorporating a modified form of the crank mechanism of FIGS. 1 and 2.

FIG. 5 shows an internal combustion engine incorporating a modified form of the crank mechanism of FIGS. 1 and 2. This engine has a further increase in turning moment when compared with the engine which incorporates the crank mechanism of FIGS. 1 and 2. This modified crank mechanism is similar to that of FIGS. 1 and 2, so like reference numerals will be used for like parts, and only the modifications will be described in detail. Thus, the connecting rod 3 of the FIG. 5 embodiment is provided with a pair of auxiliary connecting rods 21 which are constrained to move parallel to the main connecting rod by pins 22a and 22b projecting from the auxiliary connecting rods and passing through axial slots 23a and 23b formed in the main connecting rod. The upper pin 22a is a gudgeon pin connecting the auxiliary connecting rods 21 to the piston 2. The lower pin 22b constrains the auxiliary connecting rods 21 to be parallel to the main connecting rod 3 which is in rigid connection with the drive ring 5.

Figure 6:
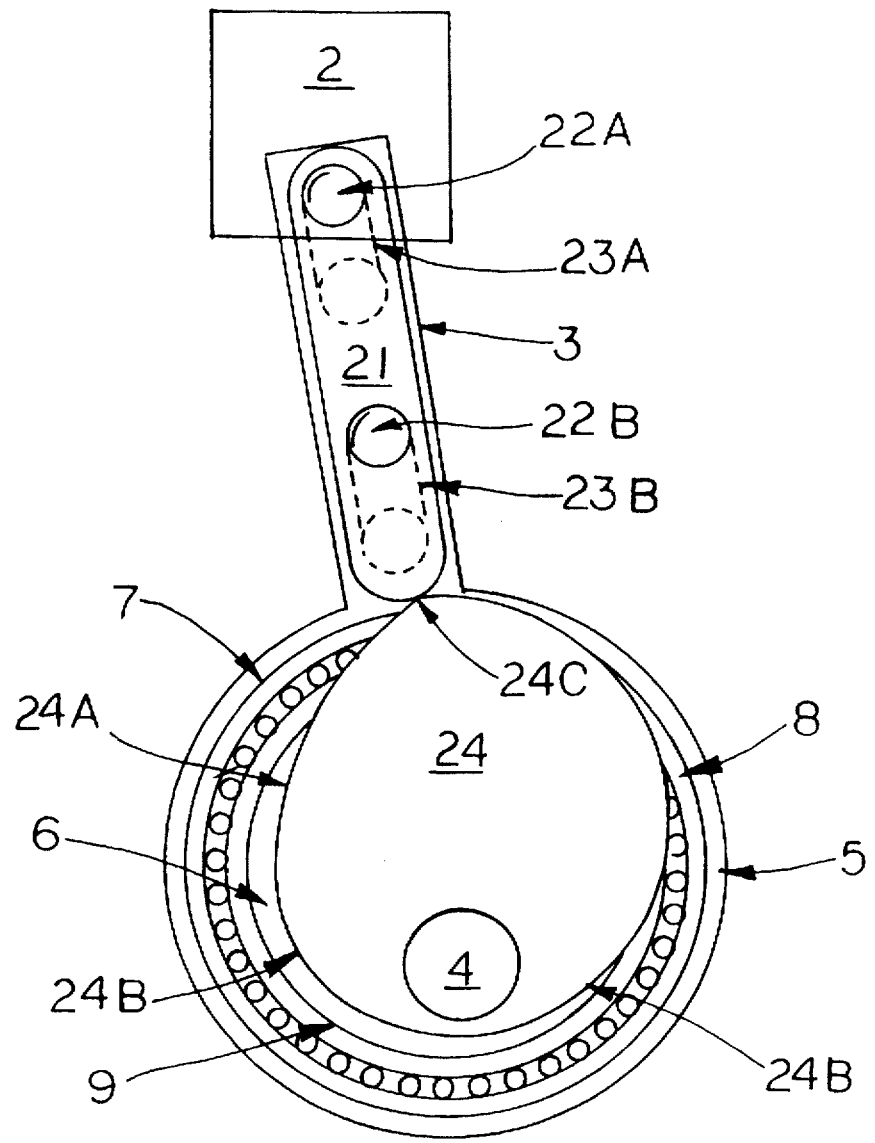
FIG. 6 is a side elevation of the crank mechanism of FIG. 5, and shows the connecting rod in more detail.

Two external cams 24 are provided, being fixed to the torque lobe 6 on opposite sides thereof. The cams 24 each have a curved drive face 24a and a curved return face 24b which meet at an apex portion 24c, the portion of the cam between the drive and return faces constituting a non-camming face 24d. As shown in FIG. 6, the apex portion 24c is coincident with the axis of the movement of the piston 2 at TDC. The piston 2 is at TDC at the commencement of its power stroke. Pressure in the cylinder 1 will cause the piston 2 to move down, thereby driving the auxiliary connecting rods 21 along the inclined drive faces 24a of the cams 24. A considerable turning moment will be exerted on these cam faces 24a which, in turn, will rotate the torque lobe 6, the cams 24, the bearing 7 and the drive ring 5.

When the torque lobe 6 and attachments are at approximately 90° after TDC, the pins 22a and 22b will reach the lower ends of the slots 23a and 23b. Here, the cam faces 24d have been relieved such that the auxiliary connecting rods 21 no longer apply force to the cams 24. This force is now transferred to the main connecting rod 3 by the engagement of the pins 22a and 22b with the lower ends of the slots 23a and 23b. The mechanism now behaves for the remaining 90° of the power stroke as the mechanism shown in FIGS. 1 and 2. This transfer of force from the cams 24 to the drive ring 5 and the torque lobe 6 is necessary because the turning moment exerted by the auxiliary connecting rods 21 at this point (90° after TDC) reduces below that which can be exerted by the main connecting rod 3. This maximises the overall turning moment on the power stroke.

On completion of the power stroke, the piston 2 is required to be returned to its starting position (with the pins 22a and 22b at the upper ends of the slots 23a and 23b) during the exhaust stroke. The return faces 24b of the cams 24 provide this function, enabling the auxiliary connecting rods 21 to be raised by the cams 24 such that all are returned to their same positions as at the commencement of the power stroke. As the engine continues to rotate past TDC, it commences its induction stroke, the inlet valve is open and the piston is descending. A partial vacuum is created in the cylinder 1 holding the auxiliary connecting rods 21 and the piston 2 such that the pins 22a and 22b are held at the upper ends of the slots 23a and 23b. It is necessary to hold the piston 2 and the auxiliary connecting rods 21 in this position to prevent physical contact of the auxiliary connecting rods with the cams 24 which would otherwise be caused by the inertia gained by these rods and the piston, their having been accelerated over the first 90° of the induction stroke. Springs 25 (one for each auxiliary connecting rod) provide the function of holding the auxiliary connecting rods 21 and the piston 2 in the positions where the pins 22a and 22b are at the upper ends of the slots 23a and 23b for the 180° rotation of the induction cycle. This also ensures that the induction stroke is not increased, which could occur, due to the descent of the piston 2 and the auxiliary connecting rods 21 had the springs 25 not been provided.

On completion of the induction stroke, the compression stroke commences. As the torque lobe 6 passes through BDC, the increasing compression in the cylinder 1 will cause the auxiliary connecting rods 21 and the piston 2 to descend gradually. By about 90° before TDC, the auxiliary connecting rods 21 will touch the return faces 24b of the cams 24 and thereafter will be lifted on these cam faces to TDC for the next power stroke.

Clearly the inclusion of the springs 25 in this mechanism will cause the storing of some energy during the power stroke, but this energy will be returned to the system on the exhaust stroke as the springs return to their rest positions.

Because the auxiliary connecting rods 21 and the piston 2 are free to move relative to the main connecting rod 3, the power stroke is increased by 50%. This extra movement does not occur on the induction stroke due to the springs 25 holding the auxiliary connecting rods 21 with the pins 22a and 22b at the upper ends of the slots 23a and 23b. This means that the pressure that would have been released in a conventional engine when the exhaust valve opens at approximately 20°–30° before BDC, is able to be utilised to create turning moment, thereby expending more energy in output as opposed to exhaust heat.

Clearly, the engine of FIGS. 1 and 2 produces an average torque which is substantially larger than that of the conventional engine, with the engine of FIG. 5 being even further improved. To summarise, the torque lobe arrangement of the crank mechanism of the present invention, in utilising the turning moment of the balls, and by the piston offset more closely matching the 'moment curve' to the 'pressure curve', greatly enhances the mechanical efficiency of the process of converting reciprocating motion to output torque.

Figure 7:
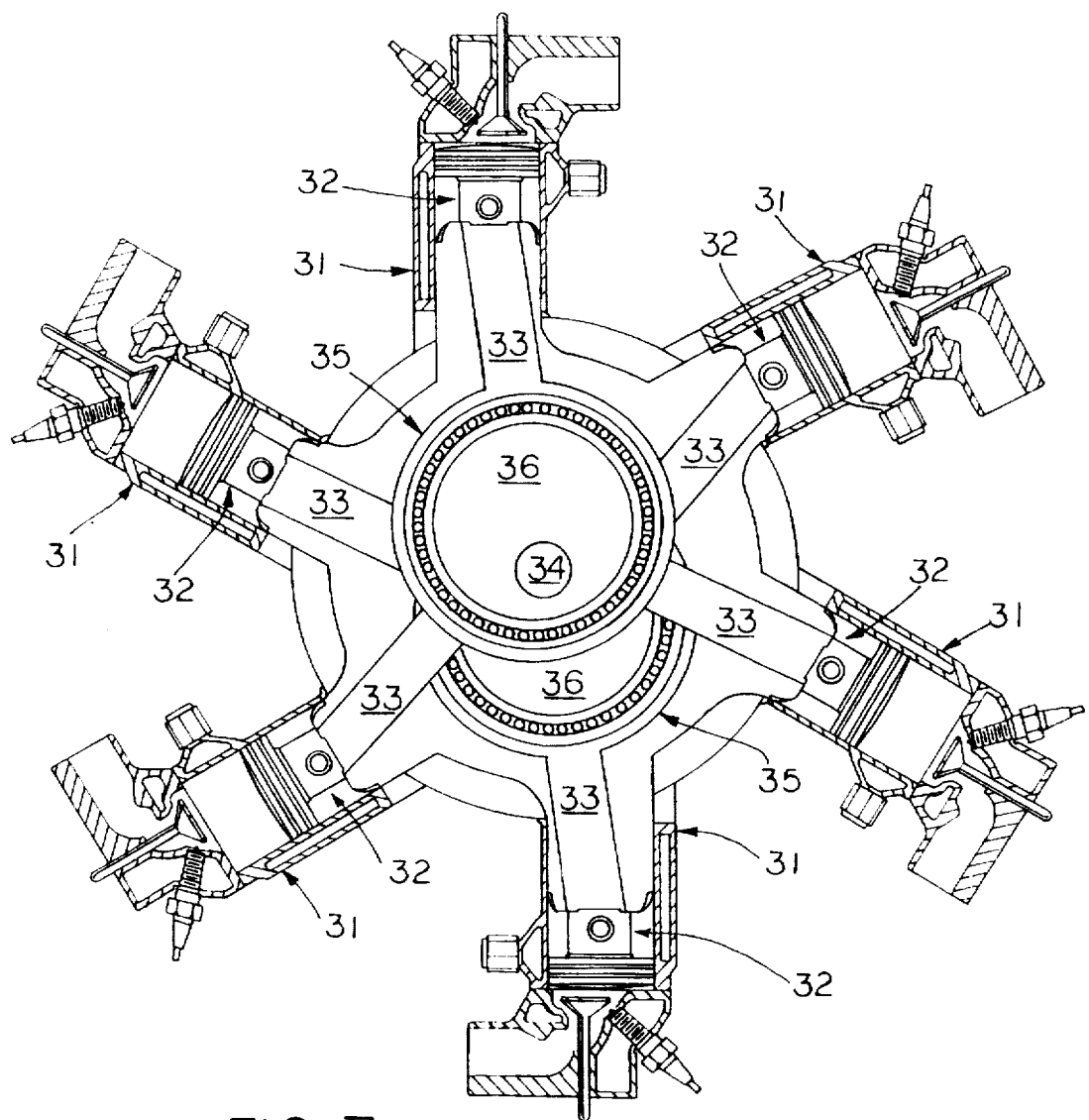
FIG. 7 is a plan view of a practical form of internal combustion engine incorporating the crank mechanism of FIGS. 1 and 2.

FIG. 7 shows a practical form of internal combustion engine incorporating the crank mechanism of FIGS. 1 and 2, this engine having two banks (only one of which can be seen—the other being directly behind) of three cylinders 31, each acting on a respective torque lobe 36. Each cylinder 31 has a respective piston 32, connecting rod 33 and drive ring 35, and its torque lobe 36 is eccentrically mounted on a common output shaft 34. A respective drive ring 35 is attached to a ring (not shown) fixed to the outer race of a respective roller bearing 37 whose inner race is fixed to the peripheral edge of the associated torque lobe 36. Each drive ring 35 is rigidly attached to its associated connecting rod 33. The torque lobes 36 of each bank are rigidly attached to each other and to the output shaft 34 for rotation therewith. Each bank of cylinders 31 is a flat radial configuration with the output shaft 34 acting vertically downwards into a gear box (not shown). The six cylinders 31 are arranged to fire in the order 1 4 2 5 3 6. This would require a distributor (not shown) to initiate a spark on both exhaust and compression strokes, and would enable the distributor to be driven directly from the output shaft 34 with no gearing. The whole arrangement, if applied to a four-stroke engine, would need inertia (provided by the lobe masses) to conserve momentum. Balancing for the oscillating mass of the pistons 32 can be provided by arranging the two banks of cylinders 31 such that the cylinders diametrically opposite one another fire together.

Obviously, the engine of FIG. 7 could, alternatively, incorporate the crank mechanism of FIGS. 5 and 6 in place of the crank mechanism of FIGS. 1 and 2.

A particular advantage of either of the crank mechanisms described above is that, by improving the overall efficiency of the associated engine, the loss of energy in the form of heat is substantially reduced, thereby reducing (or even eliminating) the need for engine cooling. This will lead to further improvements in the efficiency with which an associated vehicle is propelled, as the overall weight of the vehicle can be reduced by removing the need for components such as a cooling fan, a water pump, a water jacket and a radiator.

Each of the crank mechanisms described above has a reduced crankshaft length compared with a conventional crankshaft, and so can be used in any of the presently accepted multi-cylinder arrangements, that is to say radial, straight, flat or V-formation. This type of mechanism can also be used with any appropriate number of cylinders.

It would also be possible to operate any of the engines described above on a two-stroke cycle. The crank mechanism of the invention could also be incorporated in other forms of reciprocating engine such as a steam engine. Obviously, such a crank mechanism could also form part of a pump, for converting rotary motion of an input shaft to reciprocatory motion of a piston within a cylinder. Such a pump would have a much greater efficiency than a conventionally-cranked device. Indeed, the crank mechanism of the invention can be used with considerable advantage in any form of reciprocating/rotary or rotary/reciprocating arrangement, in any single or multi-cylinder configuration, and with any suitable fuel.

The engine of FIGS. 5 and 6, which uses cams and springs, would be particularly suitable for a constant-speed engine arrangement running at its "resonant frequency", and may be applied as an "on-board" engine for an electrically-propelled car where the engine can be used very efficiently to change the car batteries whilst the car is running.

I claim:

1. A crank mechanism for an internal combustion engine, the crank mechanism comprising a cylinder, a piston reciprocable within the cylinder, and a rotatable shaft, the piston being in drivable connection with the shaft via a connecting rod, a drive ring and a torque lobe, the connecting rod being pivotally fixed to the piston, and the drive ring being rigidly attached to the free end of the connecting rod, the torque lobe being a circular plate eccentrically mounted on the shaft for rotation therewith about the axis thereof, the drive ring being an annular sleeve which is rotatable around the rim of the torque lobe, whereby rectilinear movement of the piston is converted to rotary movement of the torque lobe or vice versa, the connecting rod being constituted by a main connecting rod and at least one auxiliary connecting rod, the or each auxiliary connecting rod being slidably fixed to the main connecting rod for axial movement relative thereto, the piston being fixed to the or each auxiliary connecting rod, and the main connecting rod being fixed to the drive ring, the or each auxiliary connecting rod being associated with a respective cam fixed to the torque lobe.

2. A crank mechanism as claimed in claim 1, wherein the drive ring is a rolling fit on the rim of the torque lobe.

3. A crank mechanism as claimed in claim 2, wherein the drive ring is mounted on the rim of the torque lobe by means of a rolling element bearing, whereby the rolling element bearing and the torque lobe rotate in the same direction, thereby increasing the turning moment of the torque lobe and hence that of the crank mechanism.

4. A crank mechanism as claimed in claim 1, wherein the axis of the piston is offset from the axis of the output shaft by a distance equal to substantially half o\the stroke of the associated piston.

5. A crank mechanism as claimed in claim 1, wherein a respective pair of auxiliary connecting rods are associated with the main connecting rod, the auxiliary connecting rods of the pair being positioned one on each side of the main connecting rod and being slidably fixed thereto by axial slots formed in the main connecting rod and pins projecting from the auxiliary connecting rods and passing through the slots.

6. A crank mechanism as claimed in claim 1 wherein the auxiliary connecting rod is associated with a cam fixed to the torque lobe.

7. A crank mechanism as claimed in claim 1, wherein a respective pair of auxiliary connecting rods are associated with the main connecting rod, the auxiliary connecting rods of the pair being positioned one on each side of the main connecting rod and being slidably fixed thereto by axial slots formed in the main connecting rod and pins projecting from the auxiliary connecting rods and passing through the slots, the two cams associated with torque lobe being fixed to opposite sides of said torque lobe.

8. A crank mechanism as claimed in claim 7, wherein each cam is formed with a cam drive face which engages with the free end of the associated auxiliary connecting rod over the first 9 ° of movement of the associated piston during its power stroke, thereby applying a turning moment to said cam and hence to said torque lobe.

9. A crank mechanism as claimed in claim 8, wherein each cam is formed with a return cam face which engages the free end of the associated auxiliary connecting rod during the movement of the associated piston in its exhaust stroke, and over the last 90° of movement of the said piston during its compression stroke.

10. A crank mechanism as claimed in claim 7, wherein each cam is formed with a cam drive face which engages with the free end of the associated auxiliary connecting rod over the first 90° of movement of the associated piston during its power stroke, thereby applying a turning moment to said cam and hence to said torque lobe.

11. A crank mechanism as claimed in claim 10, wherein each cam is formed with a return cam face which engages the free end of the associated auxiliary connecting rod during the movement of the associated piston in its exhaust stroke, and over the last 90° of movement of the said piston during its compression stroke.

12. A crank mechanism as claimed in claim 11, further comprising a respective spring associated with each auxiliary connecting rod, each spring being effective to hold the associated auxiliary connecting rod out of contact with its cam during the induction stroke of the associated piston.

13. A crank mechanism as claimed in claim 11, further comprising a spring associated with each auxiliary connecting rod, each spring being effective to hold the associated auxiliary connecting rod out of contact with its cam during the induction stroke of the pistol.

14. A crank mechanism for an internal combustion engine, the crank mechanism comprising a plurality of cylinders, a respective piston reciprocable within each of the cylinders, and a rotatable shaft, each of the pistons being in drivable connection with the shaft via a respective connecting rod, a respective drive ring and a respective torque lobe, each connecting rod being pivotally fixed to the associated piston, each drive ring being rigidly attached to the free end of the associated connecting rod, each torque lobe being a circular plate eccentrically mounted on the shaft for rotation therewith about the axis thereof, each drive ring being an annular sleeve which is rotatable around the rim of the associated torque lobe, whereby rectilinear movement of the associated piston is converted to rotary movement of the associated torque lobe or vice versa, each connecting rod being constituted by a main connecting rod and at least one auxiliary connecting rod, the or each auxiliary connecting rod being slidably fixed to the associated main connecting rod for axial movement relative thereto, each piston being fixed to the or each associated auxiliary connecting rod, and each main connecting rod being fixed to the associated drive ring, and wherein the or each auxiliary connecting rod is associated with a respective cam fixed to the associated torque lobe.

15. A crank mechanism as claimed in claim 14, wherein the or each drive ring is a rolling fit on the rim of the associated torque lobe.

16. A crank mechanism as claimed in claim 15, wherein each drive ring is mounted on the rim of the associated torque lobe by means of a respective rolling element bearing, whereby the rolling element bearings and the torque lobe rotate in the same direction, thereby increasing the turning moment of the torque lobe and hence that of the crank mechanism.

17. A crank mechanism as claimed in claim 14, wherein the axis of each piston is offset from the axis of the output shaft by a distance equal to substantially half the stroke of the associated piston.

18. A crank mechanism as claimed in claim 14, wherein a respective pair of auxiliary connecting rods are associated with each main connecting rod, the auxiliary connecting rods of each pair being positioned one on each side of the associated main connecting rod and being slidably fixed thereto by axial slots formed in the main connecting rod and pins projecting from the auxiliary connecting rods and passing through the slots.

19. A crank mechanism as claimed in claim 14, wherein each auxiliary connecting rod is associated with a respective cam fixed to the associated torque lobe.

20. A crank mechanism as claimed in claim 14, wherein the two cams associated with each torque lobe being fixed to opposite sides of said torque lobe.

21. A crank mechanism as claimed in claim 14, wherein there are six cylinders arranged in two banks of three cylinders, the cylinders in each bank being in a flat radial configuration.

22. A crank mechanism as claimed in claim 21, wherein the three torque lobes associated with each bank of three cylinders are all fixed to the output shaft in such a manner that the lines joining the centre of the output shaft to the centres of said torque lobes are angled to one another by 120°.

23. A crank mechanism for an internal combustion engine, the crank mechanism comprising a cylinder, a piston reciprocable within the cylinder, and a rotatable shaft, the piston being in drivable connection with the shaft via a connecting rod, a drive ring and a torque lobe, the connecting rod being pivotally fixed to the piston, and the drive ring being rigidly attached to the free end of the connecting rod, the torque lobe being a circular plate eccentrically mounted on the shaft for rotation with the shaft about the axis thereof, the drive ring being an annular sleeve which has a rotatable sliding fit around the rim of the torque lobe, the axis of the piston being offset with respect to the center of the output shaft whereby rectilinear movement of the piston is converted to rotary movement of the torque lobe or vice versa, the connecting rod being constituted by a main connecting rod and at least one auxiliary connecting rod, the or each auxiliary connecting rod being slidably fixed to the main connecting rod for axial movement relative thereto, the piston being fixed to the or each auxiliary connecting rod, and the main connecting rod being fixed to the drive ring, and wherein the or each auxiliary connecting rod is associated with a respective cam fixed to the torque lobe.

24. A crank mechanism for an internal combustion engine, the crank mechanism comprising a plurality of cylinders, a respective piston reciprocable within each of the cylinders, and a rotatable shaft, each of the pistons being in drivable connection with the shaft via a respective connecting rod, a respective drive ring and a respective torque lobe, each connecting rod being pivotally fixed to the associated piston, and each drive ring being rigidly attached to the free end of the associated connecting rod, each torque lobe being a circular plate eccentrically mounted on the shaft for rotation therewith about the axis thereof, each drive ring is an annular sleeve which is a rotatable sliding fit around the rim of the associated torque lobe, and the axis of each piston being offset with respect to the center of the output shaft whereby rectilinear movement of the associated piston is converted to rotary movement of the associated torque lobe or vice versa, a\each connecting rod being constituted by a main connecting rod and at least one auxiliary connecting rod, the or each auxiliary connecting rod being slidably fixed to the associated main connecting rod for axial movement relative thereto, each piston being fixed to the or each associated auxiliary connecting rod, and each main connecting rod being fixed to the associated drive ring, and wherein the or each auxiliary connecting rod is associated with a respective cam fixed to the associated torque lobe.

\* \* \* \* \*